3,030,344
POLYMERIC PRODUCT
Perry A. Argabright, Nixon, and Irving Kuntz, Roselle Park, N.J., assignors to Esso Research and Engineering Company, a corporation of Delaware
No Drawing. Filed Jan. 29, 1958, Ser. No. 711,816
8 Claims. (Cl. 260—79)

This invention is concerned with a nove elastic polymeric product. This invention is also directed to a method of producing a polymeric product by the free radical initiated reaction of an organic polyhydrosulfide with an unsaturated liquid polymer.

It has now been found that organic polyhydrosulfides, especially alkyl and aryl polymercaptans, are surprisingly useful for cross-linking liquid unsaturated resinous polymers or copolymers to produce solid products having unexpected properties. The products of this invention are rubber-like and are useful as shock absorbers, casting compounds, capacitor impregnants, potting compounds for electrical components, and caulking compounds.

In brief compass, an elastic polymer is produced according to this invention by reacting a liquid unsaturated polymer with 1 to 10 mole percent of an organic polyhydrosulfide, especially dimercaptans, through the use either of chemical free radical generators or radiation.

A particularly preferred embodiment of this invention is to react an appreciable proportion of an unsaturated monomer along with the unsaturated polymer and dimercaptans in forming the polymeric product. The product obtained is an exceptionally tough rubber-like material, and is particularly useful as a gasket material and insulator.

The casting or curing of butadiene-styrene copolymers using peroxide catalysts has been known for some time. The solid polymers obtained are strong but relatively inelastic. Butadiene-styrene copolymers cannot be cured by radiation.

A feature of the present invention is the unexpected finding that small amounts of organic polyhydrosulfides, e.g., alkyl dimercaptans, radically improve the elastic nature of the polymer product when such liquid polymers as butadiene-styrene copolymers are cured using peroxide catalysis. Further, it has been found that small dosages of relatively short wave length electromagnetic radiation cures such liquid polymers to extremely elastic compositions when a small amount of an organic polyhydrosulfide, such as a dithiol, is used. In the absence of dithiols. such liquid polymers are relatively unaffected by small doses of radiation.

The liquid polymer starting material used in this invention is a polymer or copolymer of a diene monomer, and has a viscosity in the range of 1 to 5000 poises at 100° F. Liquid polymers having a bromine number in the range of 1.6 to 180 are preferred. Liquid polymers having molecular weights in the range of 400 to 20,000 are particularly preferred.

The formation of suitable liquid resins is known to the art and forms no part of this invention. Preferably the diene monomer used to form the liquid polymer has in the range of 4 to 20 carbon atoms per molecule. Conjugate dienes having 4 to 10 carbon atoms per molecule are especially preferred. Suitable diene monomers that can be used to prepare the liquid polymer are: butadiene, isoprene, piperylene (cis or trans), cyclopentadiene, and the hexadienes.

If desired, copolymers of the above diene monomers with unsaturated monomers can be used. Usually 10 to 80 mole percent of an unsaturated monomer can be reacted with the diene. Preferably, the unsaturated monomer has 2 to 20 carbon atoms per molecule. Also, the vinyl aromatics of 8 to 20 carbon atoms, wherein the vinyl group is in resonance with the aromatic ring, are preferred. Suitable unsaturated monomers are: ethylene, propylene, butene-1, the pentenes, cyclopentene, cyclohexene, styrene, vinyl toluene, methylmethacrylate, 2-ethylhexyl acrylate, and acrylonitrile.

The organic polyhydrosulfide used is one having two or more —SH groups. The polyhydrosulfide must be liquid or be soluble in the liquid polymer. Preferably, the polyhydrosulfide has a molecular weight in the range from 94 to 500. Examples are: 1,2-ethanedithiol, 1,3-propanedithiol, tetramethylenedithiol, hexmethylene dithiol, the cyclohexanedithiols, 2,3-dimercaptopropanol-1, dithiomalonic acid, dithioterphthalic acid, α,α′-dimercaptoxylene, and ortho-, meta- and para-phenylene dithiols.

Preferably the organic polyhydrosulfide is an aryl or alkyl polymercaptan having in the range of 2 to 31 carbon atoms per molecule. Especially preferred are alkyl dimercaptans having 2 to 10 carbon atoms per molecule.

Unsaturated monomers are useful as "diluents" in controlling the initial viscosity of the reaction mixture. Preferably the unsaturated monomer has 3 to 30, preferably 4 to 13, carbon atoms per molecule, and can be, for example, a monoolefin, an unsaturated ester, or a vinyl aromatic. Examples of suitable compounds are: hexene-1, decene-1, methylacrylate, n-decylacrylate, vinyl acetate, acrylonitrile, styrene, vinyl toluene, and vinyl-hexyl ether.

The preferred proportions used in forming the liquid mixture to be cured are 50 to 99 mole percent of the unsaturated liquid polymer, 1 to 10 mole percent of the organic polyhydrosulfide, and, if used, 5 to 48 mole percent of the unsaturated monomer diluent. The liquid mixture is obtained in a straight-forward manner by simply admixing the ingredients in any order. Preferably the liquid mixture has a viscosity before curing in the range of 0.1 to 1000 poises at 100° F. whereby it can be readily cast into molds.

The liquid mixture thus obtained is cured by free radical generators at a temperature in the range of 0 to 500° F. Chemical initiators or electromagnetic radiation are convenient means for curing the mixture.

Suitable chemical initiators are known to the art. Examples are: alkyl peroxides, acyl peroxides, alkyl hydroperoxides, azo compounds, and aralkyl peroxides. Specific examples are: di-tertiary butyl peroxide, benzoyl peroxide, dicumyl peroxide, tertiary butyl hydroperoxide, azo-bis-isobutyronitrile, and acetyl peroxide. In the range of 0.2 to 5 weight percent of the chemical initiator is blended in with the liquid mixture at a temperature in the range of 0 to 150° F., followed by heating to a temperature in the range of 0 to 500° F. to cause curing of the mixture. This can take about 0.1 to 200 hours. Higher temperatures in this range result in shorter cure times.

The radiation used in the process of this invention is electromagnetic radiation having a wave length in the range of $10^{-4}$ to $10^2$ A., including both gamma and X-rays. The liquid mixture is exposed to this radiation at a dose rate in the range of 0.05 to 20 megaroentgens per hour until about 0.5 to 20 megaroentgens are absorbed.

This radiation can be obtained from any convenient source such as artificially produced radioisotopes, e.g., cobalt 60; spent fuel elements or waste fission products from nuclear reactors; from shielded nuclear reactors; from X-ray machines; and the like.

The polymer product obtained by the process of this invention has a tensile strength in the range of 10 to 500 p.s.i., and a percent elongation in the range of 10 to 400, preferably 75 to 350.

In the following examples, the irradiations were carried out in general by exposing about 10 to 200 ccs. of the liquid mixture to gamma radiation obtained from an artificially produced cobalt 60 source in the form of a hollow 2-inch pipe having a rating of about 2300 curies. The samples in suitable containers were placed near enough to the source to achieve the indicated dose rate.

The chemically initiated cross-linkings of the liquid mixtures were, in general, carried out by curing the blends at temperatures in the preferred range of 120° to 350° F. using typical peroxide catalysts.

The liquid copolymer used in these experiments was a copolymer of 25 weight percent of styrene and 75 weight percent of butadiene, marketed by the Enjay Company of New York, New York, under the name of C-oil. This liquid copolymer had a viscosity of 3500 poises at room temperature.

EXAMPLE 1

1,3-propane dithiol was used in this example. Four mixtures were made and exposed in small glass bottles to the indicated amount of radiation.

*Table I*

| Percent Dithiol | Dose Rate, Megaroentgens/hr. | Dose, Megaroentgens | Product |
| --- | --- | --- | --- |
| 1.0 | 0.21 | 2.4 | Soft Rubber. |
| 2.0 | 0.15 | 2.4 | Do. |
| 3.0 | 0.21 | 2.4 | Hard Rubber. |
| 10.0 | 0.21 | 0.42 | Factice. |

The results of this example indicate that the physical properties of the product composition are dependent on the dithiol concentration.

EXAMPLE 2

A mixture was prepared from C-oil and styrene in the proportion of 2:3 by weight, and this mixture was mixed with the reagents indicated in the table. Castings were made by curing at 200° F. for 138 hours.

*Table II*

| Casting | A | B |
| --- | --- | --- |
| C-oil—Styrene (4:3) | 100 | 100 |
| Di-t-butyl peroxide | 4 | 4 |
| 1,3-propane dithiol | 0 | 1 |
| Product Properties: | | |
| Tensile strength, p.s.i. | 570 | 290 |
| Elongation, percent | 50 | 125 |

The results of this example indicate that small amounts of dithiol are effective in improving the rubbery nature of the casting in an outstanding fashion, when the peroxide curing process is employed.

EXAMPLE 3

By careful adjustment of dithiol concentration and radiation dosage, tailor-made castings can be designed with particular properties to meet specific application. For example, an extremely rubbery material may be desired for applications where tensile strength is unimportant. Such a product is shown by this example.

Ninety-eight grams of C-oil were mixed with two grams of 1,3-propane dithiol and exposed to two megaroentgens of gamma radiation at a dose rate of 0.27 megaroentgen per hour. The product had a tensile strength of 11 p.s.i. and a phenomenal elongation of 350%.

The following examples show the formation of a rubbery polymeric product according to this invention using, in addition to the organic polyhydrosulfide, an unsaturated monomer as a diluent to obtain a mixture having a more convenient initial viscosity. These examples also show that the product of this invention can contain fillers such as inorganic silicates, clays, diatomaceous earth, carbon black, potassium chloride, sodium chloride, sodium fluoride, and sodium sulfate. When fillers are used in the compositions of this invention, they can comprise anywhere from 5 to 80 weight percent, based on total organics of the reaction mixture.

In these examples, 1,3-propanedithiol was used as the organic polyhydrosulfide, n-decylacrylate was used as the unsaturated monomer, and sodium fluoride was used as the filler. Two percent by weight on organics of the 1,3-propanedithiol was used and the slurry mixture comprised 70 percent by weight of the sodium fluoride. The amount of the n-decylacrylate used and the radiation dose used to cure the mixture are given in Table III.

*Table III*

| Example | Percent Acrylate | Tensile Strength, p.s.i.g. | Percent Elongation | Dose, Megaroentgens |
| --- | --- | --- | --- | --- |
| 4 | 4.7 | 155 | 30 | ~15 |
| 5 | 9.1 | 170 | 30 | ~15 |
| 6 | 15.1 | 175 | 25 | ~15 |
| 7 | 28 | 122 | 35 | 1.83 |
| 8 | 33 | 148 | 26 | 1.83 |
| 9 | 38 | 160 | 24 | 1.83 |
| 10 | 28 | 150 | 30 | 3.66 |
| 11 | 33 | 161 | 24 | 3.66 |
| 12 | 38 | 181 | 31 | 3.66 |
| 13 | 28 | 302 | 19 | 17.0 |
| 14 | 33 | 193 | 21 | 17.0 |
| 15 | 38 | 322 | 25 | 17.0 |

A radiation dose of 0.71 megaroentgen gave insufficient cures for mixtures containing 28, 33 and 38% n-decylacrylate. The minimum dose for this system containing a vinyl monomer diluent apparently falls between 0.71 and 1.83 megaroentgens. It is also of interest to note that the tensile strength increases with increasing total dose, whereas the percent elongation is only slightly affected.

Having described this invention, what is sought to be protected by Letters Patent is succinctly set forth in the following claims.

What is claimed is:

1. An elastic polymer comprising a liquid polymer of a conjugated diolefin having 4 to 10 carbon atoms per molecule and a viscosity of 1 to 1000 poises at 100° F. which polymer has been reacted through free radical initiation with 1 to 10 mole percent of 1,3-propanedithiol at a temperature of 0 to 500° F., said elastic polymer having a tensile strength in the range of 10 to 500 p.s.i. and a percent elongation in the range of 10 to 400.

2. An elastic copolymer comprising a liquid copolymer of 75 parts by weight of butadiene and 25 parts by weight of styrene having a viscosity of 1 to 1000 poises at 100° F. which has been reacted through free radical initiation with 1 to 10 mole percent of 1,3-propanedithiol at a temperature of 0 to 500° F., said elastic copolymer having a tensile strength in the range of 10 to 500 p.s.i. and a percent elongation in the range of 10 to 400.

3. The composition according to claim 2 in which the liquid copolymer is reacted with the dithiol by irradiating the mixture with electromagnetic radiation having a wave length in the range of $10^{-4}$ to $12^2$ A. at a dose rate of at least 0.05 megaroentgens per hour until about 0.5 to 20 megaroentgens have been absorbed.

4. A composition according to claim 2 in which the liquid copolymer is reacted with the dithiol in the presence of 0.5 to 5 wt. percent of a chemical initiator selected from the group consisting of di-tertiary butyl peroxide, benzoyl peroxide, dicumyl peroxide, tertiary butyl hydroperoxide, azo-bis-isobutyronitrile, and acetyl peroxide at a temperature between 0 and 500° F.

5. A process comprising forming a homogeneous mixture of a liquid polymer of a conjugated diolefin having 4 to 10 carbon atoms per molecule and a viscosity of 1 to 1000 poises at 100° F. with 1 to 10 mole percent of 1,3-propanedithiol at a temperature of 0 to 500° F. by means of free radical initiation until said mixture is converted to a solid elastic polymer.

6. Process of claim 5 in which the liquid polymer is a copolymer of 75% parts by weight of butadiene and 25 parts by weight of styrene.

7. Process of claim 5 in which the copolymer is reacted with the dithiol by irradiating the mixture with electromagnetic radiation having a wave length in the range of $10^{-4}$ to $10^2$ A. at a dose rate in the range of 0.5 to 20 megaroentgens per hour until 0.5 to 20 megaroentgens have been absorbed.

8. Process of claim 7 in which the copolymer is reacted with the dithiol in the presence of 0.05 to 5.0 wt. percent of a chemical initiator selected from the group consisting of ditertiary butyl hydroperoxide, azo-bis-isobutyronitrile, and acetyl peroxide at a temperature of between 120 and 350° F. for a period of time between 0.1 and 200 hours.

References Cited in the file of this patent

UNITED STATES PATENTS

| | | |
|---|---|---|
| 2,583,975 | Tawney | Jan. 29, 1952 |
| 2,696,476 | Kleinbacker | Dec. 7, 1954 |
| 2,721,185 | Schulze et al. | Oct. 18, 1955 |
| 2,767,156 | Tawney | Oct. 15, 1956 |
| 2,903,440 | Heiligmann | Sept. 8, 1959 |

OTHER REFERENCES

Hull et al.: Ind. Eng. Chem., 40, 513–517 (1948).